(12) United States Patent
Faneuf

(10) Patent No.: US 7,055,281 B1
(45) Date of Patent: Jun. 6, 2006

(54) COMBINATION ROPE AND CLIP FOR CULLING FISH

(75) Inventor: Daniel Faneuf, Milford, NH (US)

(73) Assignee: Plasti-Clip Corporation, Milford, NH (US)

( * ) Notice: Subject to any disclaimer, the term of this patent is extended or adjusted under 35 U.S.C. 154(b) by 432 days.

(21) Appl. No.: 09/723,868

(22) Filed: Nov. 28, 2000

(51) Int. Cl.
*A01K 65/00* (2006.01)

(52) U.S. Cl. .............................. 43/43.1; 43/44.6; 43/55

(58) Field of Classification Search .................. 43/1, 43/4, 4.5, 43.1, 43.16, 43.6, 44.6, 55; 224/103
See application file for complete search history.

(56) References Cited

U.S. PATENT DOCUMENTS

| | | | |
|---|---|---|---|
| 3,561,652 A | 2/1971 | Ruter .............................. 224/7 |
| 4,277,863 A * | 7/1981 | Faneuf .......................... 24/3 R |
| 4,328,916 A | 5/1982 | Lucas .......................... 224/103 |
| 4,484,405 A | 11/1984 | Woods .......................... 43/4.5 |
| 5,048,219 A | 9/1991 | Georgescu ........................ 43/4 |
| 5,104,088 A * | 4/1992 | Bakanowsky, III ...... 248/442.2 |
| 5,207,013 A | 5/1993 | Bartok et al. ..................... 43/4 |
| 5,600,873 A | 2/1997 | May .............................. 24/3.2 |
| 5,761,843 A | 6/1998 | Lynch et al. .................. 43/4.5 |
| 6,044,582 A | 4/2000 | Johnson ............................ 43/4 |
| 6,056,173 A * | 5/2000 | Gillespie .................... 224/247 |

FOREIGN PATENT DOCUMENTS

JP 11169596 A * 6/1999

OTHER PUBLICATIONS

Author Unknown, Date Unknown, Quik-Cull website, www.quik-cull.com.*
Page from Plasti-Clip Brochure, date—at least as early as 1998, entitled "Plasti-Clip Hang Ups".

* cited by examiner

*Primary Examiner*—Teri Pham Luu
*Assistant Examiner*—K. Smith
(74) *Attorney, Agent, or Firm*—Hayes Soloway P.C.

(57) ABSTRACT

A clip and rope combination is disclosed for holding a fish. The clip is shaped to securely hold the fish by gripping the lip of the fish. The rope is coupled to the clip such that any force exerted on the rope increases the gripping power of the clip.

17 Claims, 5 Drawing Sheets

COMBINATION ROPE AND CLIP FOR CULLING FISH

FIELD OF THE INVENTION

This invention relates to an apparatus for use in the sport of fishing.

BACKGROUND OF THE INVENTION

In a bass fishing tournament, the limit of a single fisherman is often five fish, the limit for a team is often seven fish, and salt-water limits can be ten fish. It is important for a fisherman, when fishing in a tournament, to have a quick and easy way to cull fish. When the maximum number of fish is caught and put in the live well, and the fisherman has caught another fish, it is time to start culling. Culling is an ongoing process of releasing the smallest fish and replacing it with a larger fish. Many different methods have been developed over the years for identifying which fish is the smallest. Often a hook or a clip with some type marker is attached to the fish. The hook or clip can be attached to the fish through the fish's mouth or to one of the fish's fins. Some of these hooks or clips can injure the fish by puncturing holes in fish. Some of these hooks and lips have a length of cord attached that can become entangled with other hooks, clips or cords. These cords often sink to the bottom of the live well unless tied to the wall of the live well.

BRIEF SUMMARY OF THE INVENTION

The present invention is intended to overcome these disadvantages. Accordingly, it is an object of the present invention to provide a fish friendly clip for holding a fish without puncturing the fish.

It is a further object of the present invention to provide a clip coupled to a length of floating rope to allow the user to easily retrieve a fish from a live well without having to reach below the surface of the water.

It is a further object of the present invention to provide a clip coupled to a length of rope such that the force exerted by the rope on the clip tends to increase the gripping force of the clip.

The above and other objects, feature, and advantages of the present invention will be apparent in the following detailed description thereof when read in conjunction with the appended drawings wherein the same reference numerals denote the same or similar parts throughout the several views.

DETAILED DESRIPTION OF THE DRAWINGS

Figure 1:
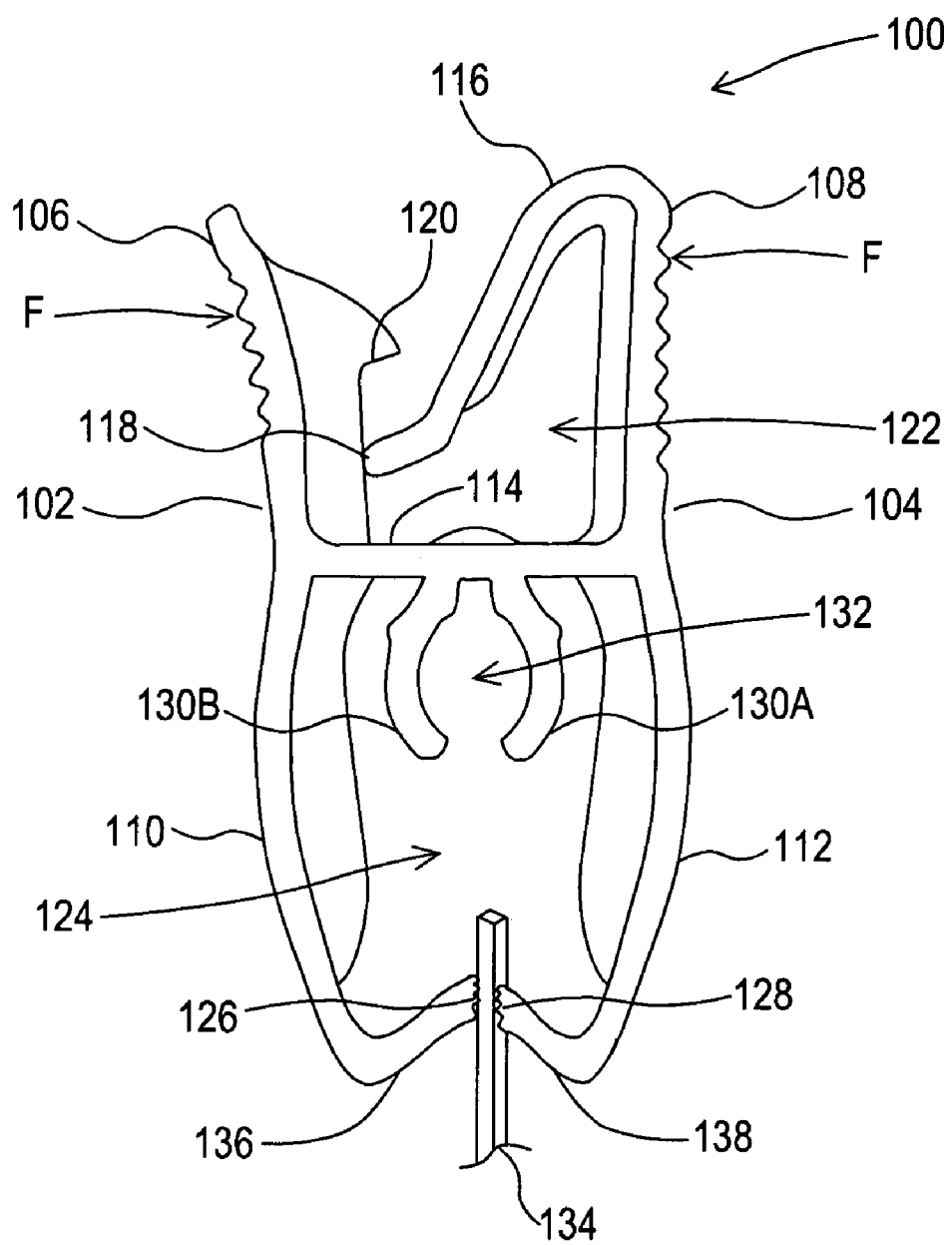
FIG. 1 is a front view of a prior art molded clip.

FIG. 1 shows a one piece molded clip 100 according to the prior art. The clip is molded of an acetal resin, preferably DuPont DELRIN. The clip has a first rigid member 102 spaced from a second rigid member 104. A spacer 114 joins the rigid members. Member 102 has an upper portion 106 that extends upward from the spacer 114 and a lower portion 110 that extends downward from the spacer 114. Likewise, member 104 has an upper portion 108 that extends upward from the spacer 114 and a lower portion 112 that extends downward from the spacer 114. The upper portions 106 and 108 are shown having a plurality of grooves to assist in gripping the clip. At the distal end of each of the lower portions 110 and 112 furthest from the spacer 114 is a protrusion 136 and 138. The protrusions 136 and 138 extend towards each other and are angled upward towards the spacer 114. At the end of the protrusions 136 and 138 are gripping portions 126 and 128 respectively. The gripping portions 126 and 128 are shown having a plurality of grooves to assist in the gripping of items. The spacer 114 joins the rigid member 102 and 104, spaces them, and operates as a fulcrum. The clip is designed such that in the absence of any forces applied to the upper portions 106 and 108, the gripping portions 126 and 128 are in close proximity. A force F applied to the upper portions 106 and 108 of rigid members 102 and 104 urges the griping portions 126 and 128 to separate. A biasing member 116 opposes the force F. An item 134 inserted between the gripping portions 126 and 128 when they are spaced will be secured when the force is removed. The biasing member 116 extending from the upper portion 108 of rigid member 104 increases the amount of force available at the gripping portions 126 and 128. An end 118 of the biasing member 116 travels against the inside wall of upper portion 106. The end 118 is capable of travel between a ledge 120 and spacer 114. A first opening 122 is formed by the biasing member 116, upper portions 106 and 108, and the spacer 114. The lower portions 110 and 112, the protrusions 126 and 128 and the spacer 114 form a second opening 124. Extending from the spacer 114 into the second opening 124 is a pair of protrusions 130A and 130B. The protrusions 130A and 130B form a flexible opening 132.

Figure 2:
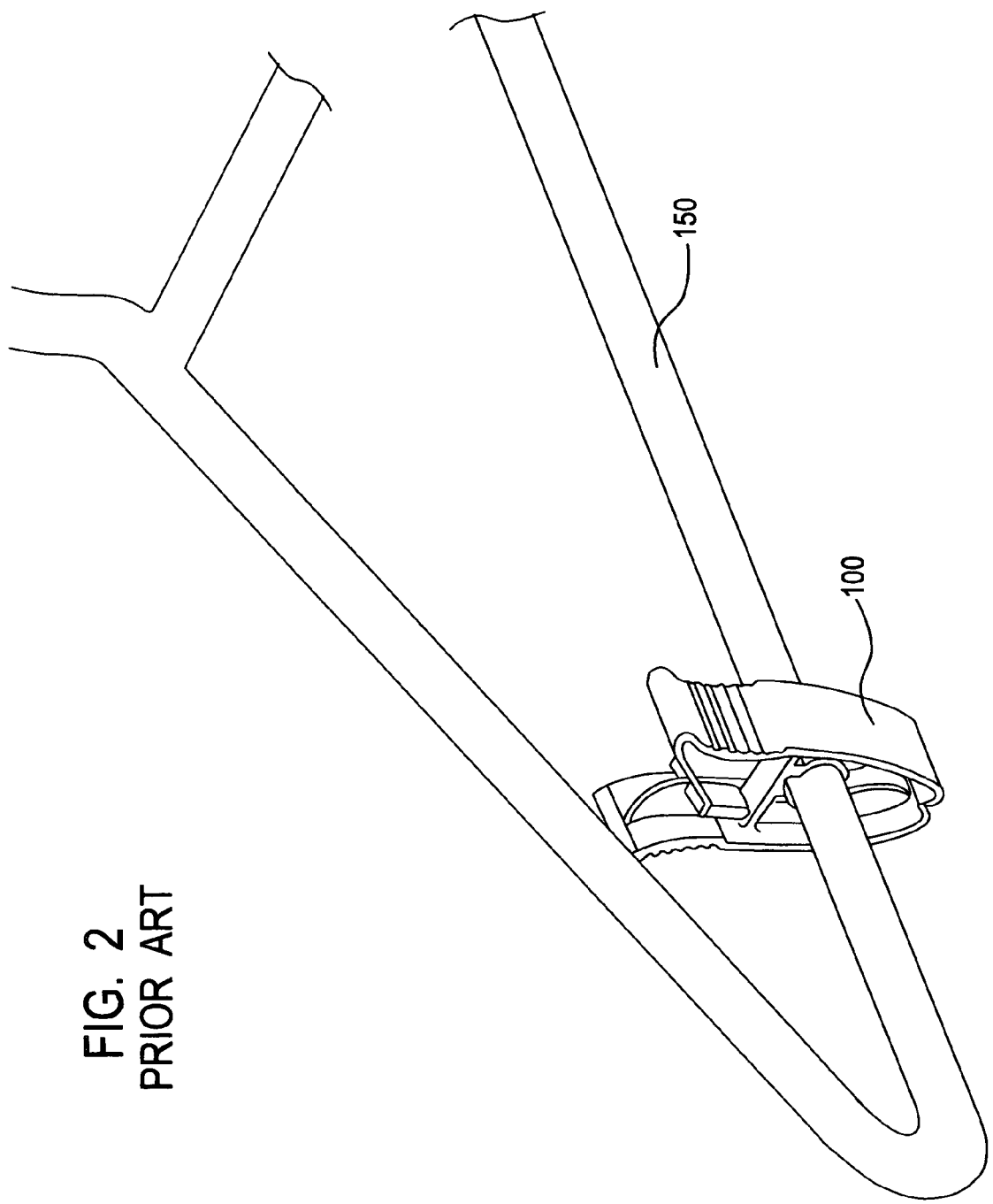
FIG. 2 is an isometric view of the plastic clip of FIG. 1 secured to a plastic garment hanger.

As shown in FIG. 2, the clip 100 can be secured to a garment hanger 150. A pair of clips can be used to secure a variety of items, such as a pair of pants, to the hanger 150. The flexible opening 132 is used to connect the clip 100 to the hanger 150. The flexible opening 132 is sized to fit hangers with a diameter between ¼" and 3/32". The one-piece molded design of the clip has no metal parts to rust or stain secured items.

Figure 3:
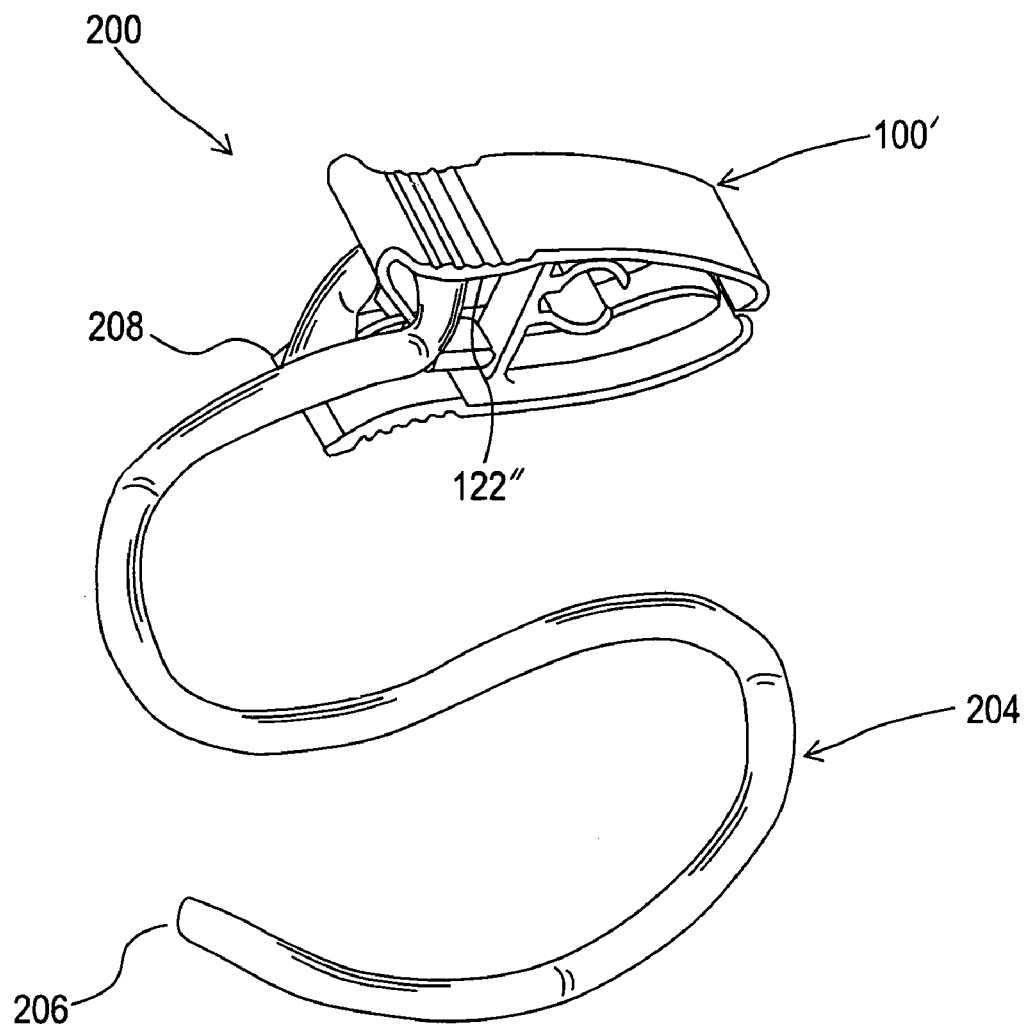
FIG. 3 is an isometric view of a combination clip and rope consistent with the present invention.

FIG. 3 shows an assembly 200 comprised of a clip 100' and a length of rope 204. The clip 100' may be the same as clip 100 shown in FIG. 1 but does not have to be identical. The rope 204 is preferably a 10" to 24" length of braided hollow polypropylene rope. Braided hollow polypropylene is preferred because it has a positive buoyancy, i.e. floats in water. Ropes of other material can alternatively be used. The rope 204 has a first end 206 and a second end 208. The first end 206 is preferably melted to prevent fraying. The second end 208 is preferably threaded through an opening 122' in the clip 100' and then turned in and threaded back inside the rope 204. Alternatively, the first end 206 can be formed into a loop large enough to fit over a fisherman's hand by threading the end 206 back in side the rope 204. This threading can be done with the help of a fid, not shown. U.S. Pat. No. 6,044,582 discloses a method for forming a loop in a length of braided rope. The '582 patent is herein incorporated by reference in its entirety.

Figure 4:
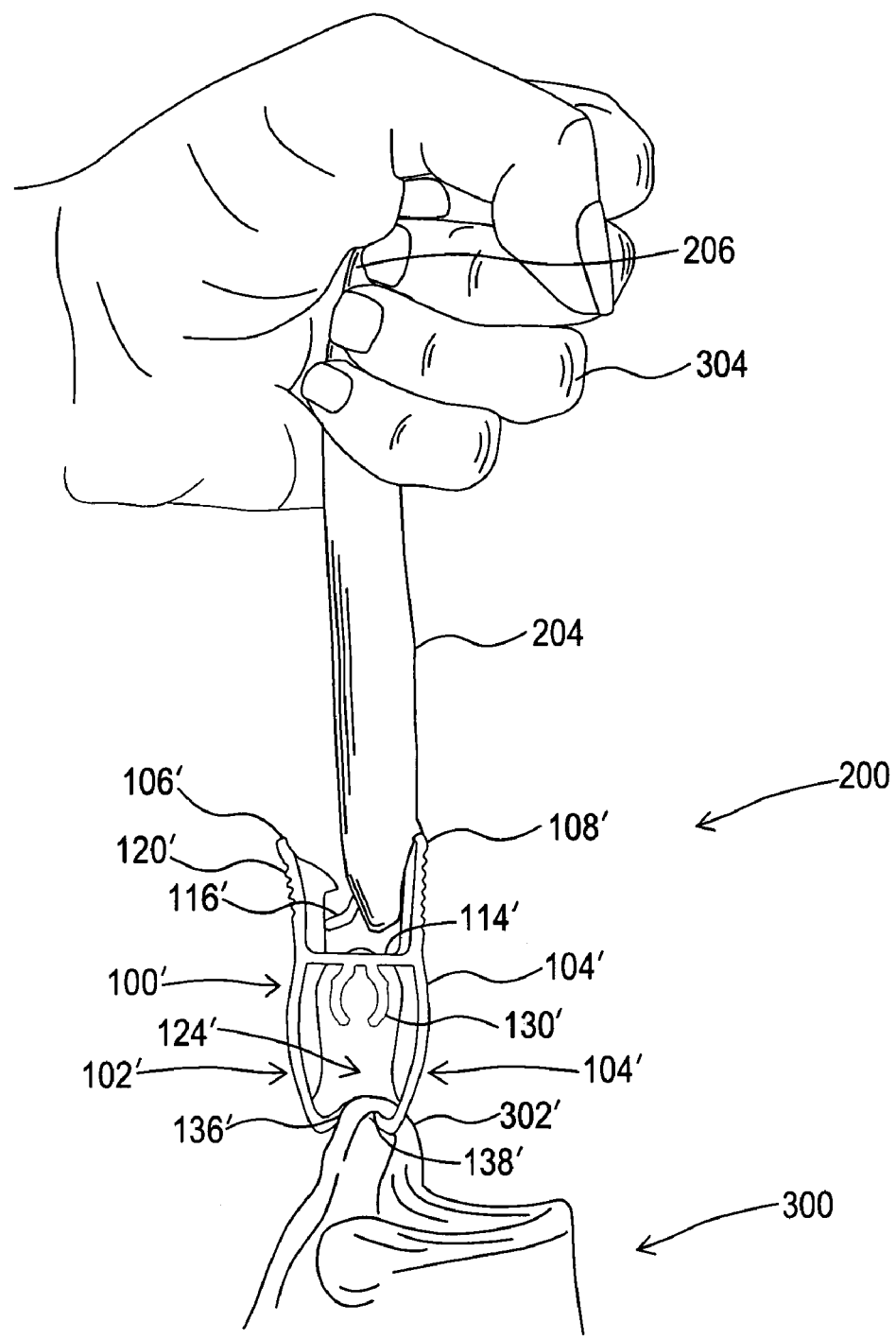
FIG. 4 is a front view of the combination clip and rope of FIG. 3 used by a fisherman to hold a fish.

FIG. 4 shows a fish 300 secured to the assembly 200. A fisherman securely holding the rope 204 in his hand 304 holds the assembly 200 vertically. A pair of upwardly extending protrusions 136' and 138' of the clip 100' securely holds the fish 300 by gripping the fish's lip or jaw 302. The weight of the fish 300 is resisted by the fisherman exerting an equal and opposite force on the rope 204. The force caused by the fisherman pulling on the rope 204 urges a biasing member 116' upward. An end 118' of the biasing member 116' travels against the inside wall of upper portion 106. The upward movement of the biasing member 116' urges the upper portions 106' and 108' to move away from each other which causes the protrusions 136' and 138" to move towards each other. Travel of the end 118' of the biasing member 116 is restricted by a ledge 120, which in turn increases the maximum weight capacity of the clip. The rigid members 102' and 104' are capable of rotating about the spacer 114'. Thus, the heavier the fish, the greater the gripping force applied to the fish lip or jaw by the protrusions 136' and 138'. The upward angled protrusions 136' and 138' form a reverse taper that can positively clamp the fish's lip. The fish can be positioned relative to the clip 100' such that the gripping portions 126' and 128' grab the fish just below the fat portion of the fish's lip. The ledge 120 prevents the biasing member 116' from coming loose when an upward force is applied to the rope 204. A protrusion 130' can be used as a lip stop to prevent the fish from being inserted too far into the clip 100'.

After a fisherman catches a fish he wants to keep, he simply squeezes the upper portions 106' and 108' of the clip 100' with his fingers, inserts the fish's mouth in the opening 124', and then releases the upper portions 106' and 108'. The fisherman can then put the fish 300 and the assembly 200 into the live well. The fish is free to swim around the live well. The end 206 of the rope 204 floats on the top of the water. When the fisherman wants to remove a fish from the live well, all he has to do is grab the end of the rope floating on top of the water in the live well.

The combination clip and rope can be sold in kits of five or more. Preferably, each of the ropes is a different color. The different colors allow the fisherman to quickly and easily find the smallest fish by grabbing the appropriate colored rope. The fisherman may use a list to keep track of the weight and the corresponding color of rope. Alternatively, the first end 204 can include an indicator upon which the fish weight can be written.

Figure 5:
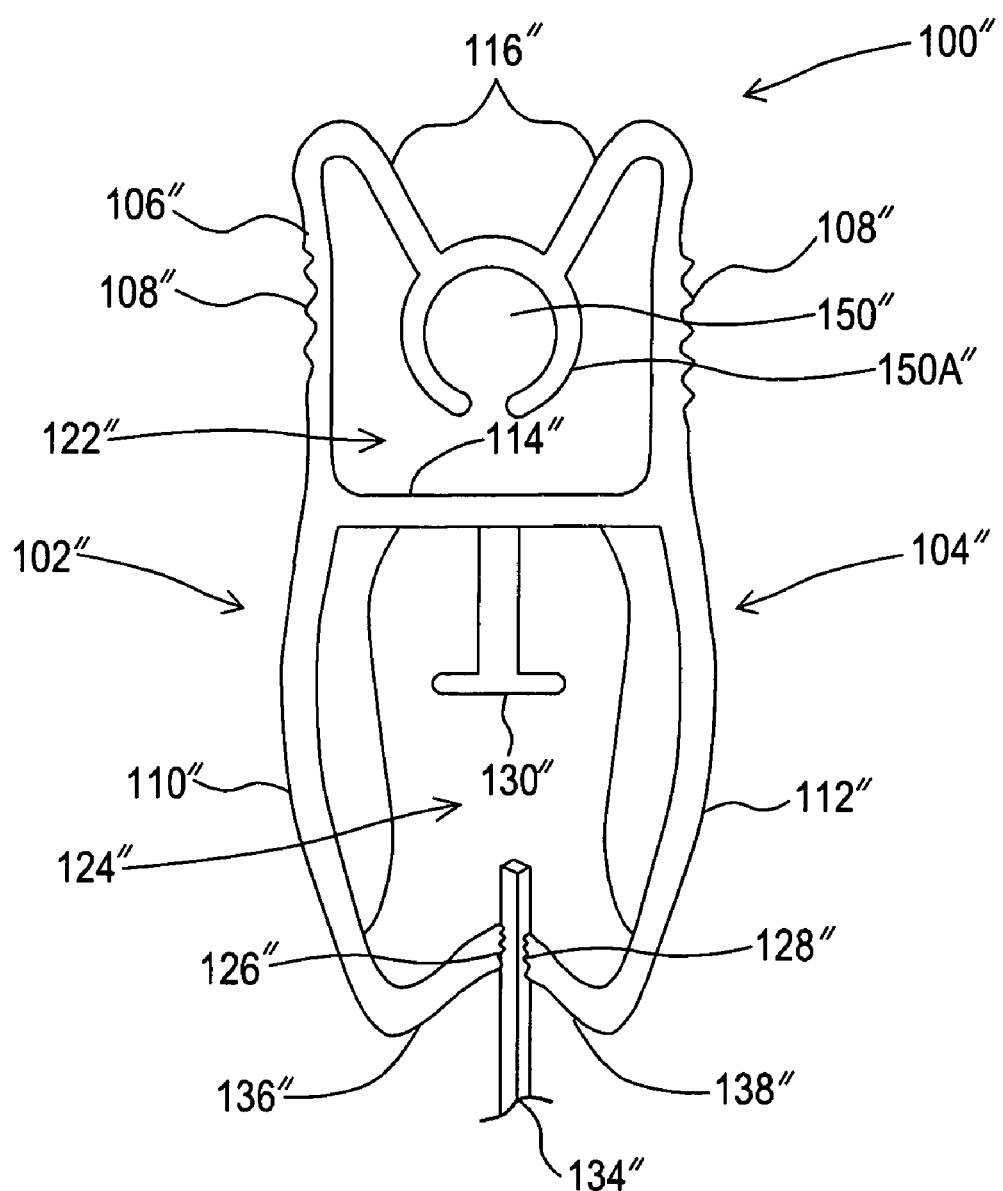
FIG. 5 is a second embodiment clip consistent with the present invention.

FIG. 5 shows a second embodiment of a clip 100". The clip 100" shows an alternative biasing member 116" and lip stop 130". The biasing member 116" is coupled to the ends of upper portions 106" and 108". Coupled to the biasing member 116" is a pair of protrusions 150A" and 150B". The protrusions 150A" and 150B" form an opening 150". The opening 150" provides a convenient coupling location for a rope. When a force is exerted upward on the coupled rope, the force urges the upper portion 106" and 108" away from each other which urges protrusions 136" and 138" closer together thereby increasing the gripping force of the protrusion 136" and 138". The alternative lip stop 130" is shown as a "T".

It should be understood that, while the present invention has been described in detail herein, the invention can be embodied otherwise without departing from the principles thereof, and such other embodiments are meant to come within the scope of the present invention as defined in the following claim(s)

What is claimed is:

1. An apparatus for holding a fish, comprising:
a molded plastic clip having first and second arms coupled to and rotatable about a spacer, the first and second arms having first and second protrusions respectively adjacent their distal ends moveable between a first position and a second position, the distal ends of the first and second arms being urged towards one another by a biasing member to create a gripping force between the first and second protrusions, in the first position, the gripping force capable of holding a fish by a lip without punching a hole in the fish, a third protrusion extending from the spacer for preventing a fish from being inserted too far onto the clip, and a ledge spaced from the spacer for restricting movement of the biasing member; and
a length of rope having a loop formed at a first end, the loop securing the rope to the clip, the loop capable of exerting a force on the biasing member thereby increasing the gripping force.

2. The apparatus of claim 1, wherein the fist second and third protrusions, the first and second arms and the biasing member are molded as one piece.

3. The apparatus of claim 1, wherein the rope is a braided hollow polypropylene.

4. The apparatus of claim 3, wherein the loop is formed by inserting the first end of the rope inside the hollow rope a spaced distance from the first end.

5. The apparatus of claim 1, wherein the rope comprises a second end, the second end forming a loop to assist in holding the rope.

6. The apparatus of claim 1, wherein the rope comprises a second end, the second end comprising a marker for indicating the weight of an attached fish.

7. The apparatus of claim 1, wherein the first and second protrusions are angled towards the biasing member.

8. The apparatus of claim 1, wherein the first and second protrusions further comprise a plurality of grooves to assist in the holding of the fish.

9. An apparatus for holding a fish, comprising:
a clip formed of two or more molded plastic elongated rigid members, the rigid members having a first end and a second end, the rigid members each having a gripping portion at the first end for holding a fish by a lip without punching a hole in the fish, the rigid members rotatable about a spacer located between the first ends and the second ends, a biasing member coupled to the rigid members urging the second ends to move away from one another and the first ends to move towards one another, a protrusion extending from the spacer for preventing a fish from being inserted too far onto the clip, and a ledge spaced from the spacer for restricting movement of the biasing member; and
a length of rope coupled to the biasing member, the rope capable of exerting a force on the biasing member further urging the second ends of the rigid members to move away from one another.

10. The apparatus of claim 9, wherein the rigid members, the spacer, and the biasing member are molded as one piece.

11. The apparatus of claim 9, wherein the rope is a braided hollow polypropylene.

12. The apparatus of claim 11, wherein the rope has a loop formed at a first end of the rope, the loop coupling the rope to the clip.

13. The apparatus of claim 12, wherein the loop is formed by inserting the first end of the rope inside the hollow rope a spaced distance from the first end.

14. The apparatus of claim 9, wherein the rope comprises a second end, the second end forming a loop to assist in holding the rope.

15. The apparatus of claim 9, wherein the rope is adapted to float on the surface of water.

16. An apparatus for holding a fish, comprising:
a molded plastic clip having a first member and a second member coupled to and pivotal about a spacer, a first protrusion disposed at a first end of the first member and a second protrusion disposed at a first end of the second member, the first and second protrusions extending towards each other and angled towards the spacer, the first and second protrusions being moveable between a first position and a second position, a biasing member spaced from the spacer, the biasing member having a first end coupled to a second end of the first member and a second end in sliding contact with the second member, the biasing member causing the first and second protrusions to move towards each other to create a gripping force between the first and second protrusions capable of holding a fish by a lip without punching a hole in the fish;
a third protrusion extending from the spacer for preventing a fish from being inserted too far onto the clip; and
a length of rope having a loop formed at a first end, the loop securing the rope to the clip, the loop capable of exerting a force on the biasing member thereby increasing the gripping force.

17. The apparatus for holding a fish of claim 16, wherein the first and second protrusions have a plurality of grooves to assist in the gripping of the fish.

* * * * *